(No Model.)  2 Sheets—Sheet 1.
C. SELLERS.
THRUST BEARING.
No. 602,589. Patented Apr. 19, 1898.
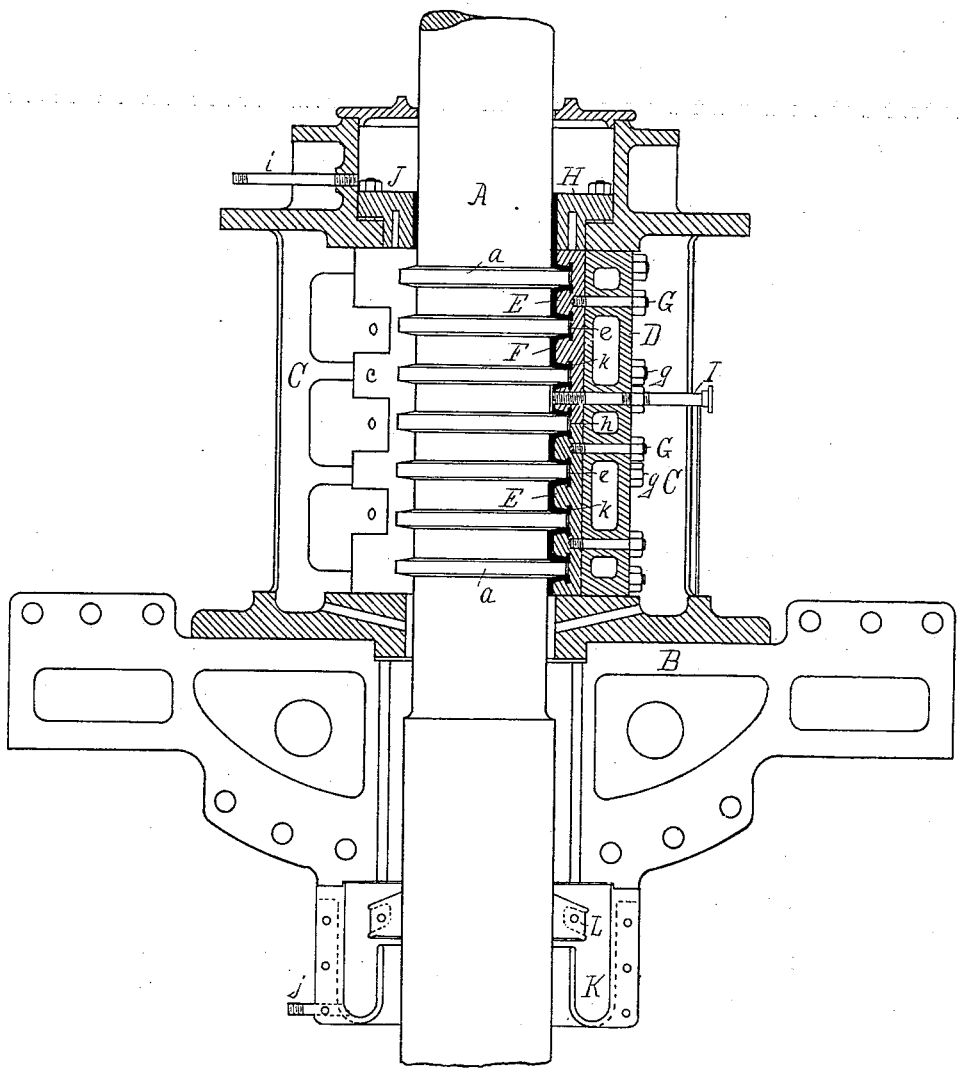
Fig. I.
Witnesses:
Harvey L. Brown,
A.W. Macomber.
Inventor:
Coleman Sellers,
by his Attorney
William Macomber (No Model.)    C. SELLERS.    2 Sheets—Sheet 2.
THRUST BEARING.
No. 602,589.    Patented Apr. 19, 1898.
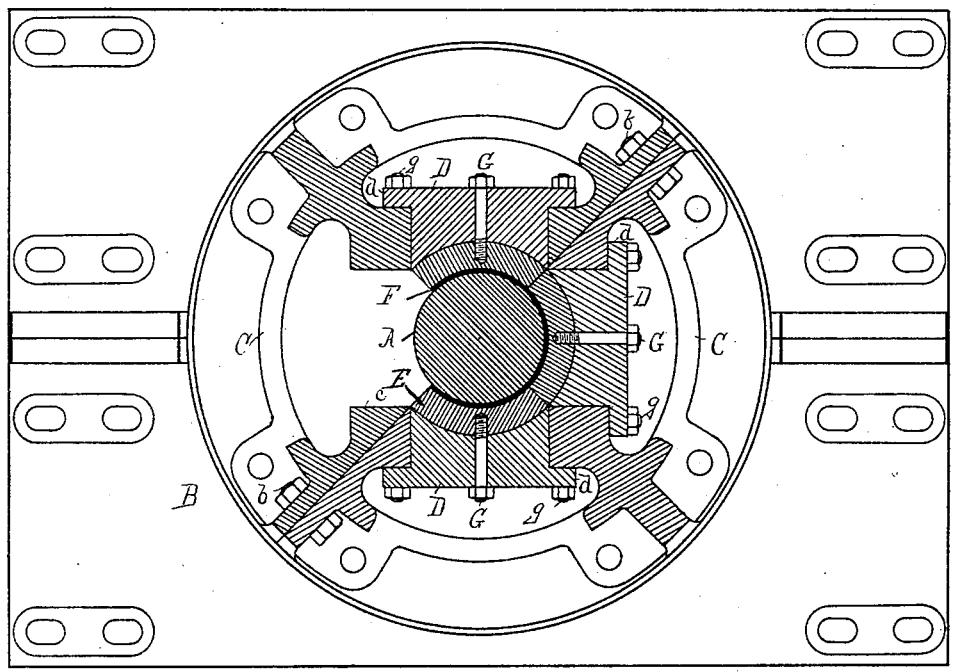
Fig. II.
Witnesses:
Harvey L. Brown.
A. W. Macomber.
Inventor:
Coleman Sellers,
by his Attorney
William Macomber.

UNITED STATES PATENT OFFICE.

COLEMAN SELLERS, OF PHILADELPHIA, PENNSYLVANIA, ASSIGNOR, BY MESNE ASSIGNMENTS, TO THE NIAGARA FALLS POWER COMPANY, OF NIAGARA FALLS, NEW YORK.

THRUST-BEARING.

SPECIFICATION forming part of Letters Patent No. 602,589, dated April 19, 1898.

Application filed October 4, 1897. Serial No. 654,065. (No model.)

*To all whom it may concern:*

Be it known that I, COLEMAN SELLERS, a citizen of the United States, residing at the city of Philadelphia, in the State of Pennsylvania, have invented certain new and useful Improvements in Thrust-Bearings, of which the following is a full, clear, and exact description.

In the construction of collar-thrust bearings, more especially for vertical shafts, the function of which bearing is primarily to control the vertical position of that shaft and to resist pressure due to force applied axially in either direction—*i. e.*, tending to lift the shaft in the one case or to carry the weight of the shaft in the other—it is essential that all the bearing-surfaces be accurate in fit to either side of the collars on the shaft. The bearing-surfaces of the brasses must also be uniform in contour with the part of the collar or collars that take the bearing on the brasses that constitute the bearing. The whole bearing-surfaces in contact with the shaft must therefore be fitted to meet the usual condition of a collar-thrust and at the same time serve the purpose of guiding the shaft and holding it in line with the bearings. In other words, it must serve the double purpose of a bearing for shafting and act as a thrust-bearing somewhat after the manner of the collar-thrust of a propeller-shaft or a steamer-shaft, in which the going ahead or backing acts to throw the pressure on either side of the collars or rings on the shaft.

In my experience in the construction of bearings of this class, particularly in connection with large machinery, important problems have arisen which will be the more readily understood by reference to the former methods of construction. It has been customary to construct the blocks that carry the brasses fitted to the shaft in four separate segments, to secure them in place within the frame of the bearing, and then by placing the entire bearing case or frame with its bronze blocks in a lathe to true up the bearing-surfaces. A bearing thus made is efficient and satisfactory; but when occasion arises requiring that any one of the brasses should be replaced by another it is impossible by this method of construction to so replace a brass by another without first placing it within the frame of the bearing and then by placing the entire bearing case or frame with its bronze blocks in a lathe to true up the bearing-surfaces. This is an expensive and tedious process. Moreover, it is essential in the use of such bearings that there should be interchangeability of brasses, and while any number of sets of original bearings may be made in the former manner they are interchangeable only in sets and only with reference to a particular frame or stand to which they are fitted. It is also highly important that perfect lubrication of these bearings be maintained at all times, a condition which cannot be assured by the mere application of oil and depending solely upon gravity and rotation of the shaft to carry the oil-well over the entire bearing-surface. These problems, encountered in practice, I have solved in the manner which I will now describe, reference being had to the accompanying drawings, consisting of two sheets, in which like letters refer to like parts.

Figure I is a section upon the axis of the bearing, showing one of the segments and retaining-blocks in place and one removed and also showing my means of lubrication. Fig. II is a cross-section at right angles to Fig. I, showing three of the segments in place and one entirely removed.

A is the shaft, and $a$ $a$ are the thrust-collars, which are integral with the shaft.

B is the bed-plate, upon which the frame or stand of the bearing rests.

C C constitute the frame or stand of the bearing, which I preferably cast in two semi-cylindrical segments and secure together by bolts $b$ $b$. This frame or stand C is provided with sectional columns $c$ $c$, which have their inner faces carefully dressed parallel in pairs to receive the retaining-blocks D D and which have the adjacent exterior faces similarly dressed to conform to the flanges $d$ $d$ of the retaining-blocks. The interior surfaces of these retaining-blocks are concave and made concentric with the shaft A. The perfect interchangeability is attained by the fixed concentricity of the interior surface of the blocks D D in relation to the rotating surface of the shaft A. Between the inner faces of these retaining-blocks D D and the shaft A a sufficient space remains for the insertion of the concavo-convex bearing-segments E E. These segments are provided with annular recesses to conform to the thrust-collars $a$ $a$ upon the shaft A; but as it is desirable that these segments should be faced with an antifriction alloy, such as Babbitt metal, I provide proper recesses, as shown at K K, for retaining the facing of such alloy, which is shown at F. It is also especially desirable, in the case of high speed, that the bearing-faces should be against the shaft A rather than against the periphery of the collars $a$ $a$, thus taking advantage of a lower speed in rotation, and to accomplish this I cut the annular recesses $e$ $e$ sufficiently deep to clear the periphery of the collars $a$ $a$. These bearing-segments E E are secured to the retaining-blocks D D by bolts G G, and the retaining-blocks D D are secured to the pillars $c$ $c$ by bolts $g$ $g$. A gland H is let down upon the upper ends of the bearing-segments E E by bolts taking into the frame, so as to prevent the thrust from disturbing their position and also for facility in removing the segments E E, the bolts G G being slacked up when the segments or brasses E E are taken out. The gland-lap H is made in halves and must be secured to position with bolts sufficiently strong to resist the upward pressure. The cylindrical part is turned to fit the dressed part of the upper end of case C. This should be bored to the intended diameter of the concavo-convex surface of the blocks D, and when a number of these bearings are used in one establishment the external diameter of the gland-lap H is used as a gage to bore the inner surface of the blocks D.

In large bearings, such as I have shown, it is desirable that the concavo-convex bearing-segments E E should be divided transversely, as shown at $h$ in Fig. I, thus making two sections of each segment. The advantages gained are facility and accuracy in truing up the inner faces and facility in removing or replacing the sections, as each of the two sets of segments E E can be held in a concentric chuck and dressed by any overhanging tool attached to the slide-rest of the lathe on which the work is being executed.

I is an oil-inlet passing through one retaining-block and one segment and which at its inner end connects with the bearing-surface and at its outer end connects with a supply of oil under pressure. The oil forced inward is distributed over the entire surface of the bearing, and the portion which is forced upward collects in the annular recess J and from thence is carried away through the pipe $i$. The portion which is forced downward is collected in the annular recess K by means of a collar or shedding-ring L, which is secured to the shaft A, and from thence the oil is carried away through the pipe $j$.

It is evident when the retaining-blocks D D have been properly secured in place once for all and the proper concentricity with the shaft attained that these segments E E may be interchangeably removed or replaced at will and that they may be refaced with a bearing metal or alloy and fitted to a templet of the shaft and reinserted with perfect assurance of securing absolute concentricity and adjustment, and it is also evident that new segments may be similarly made and inserted at any time, which will come to place with equal certainty, thus rendering repair inexpensive, quick, and certain, results absolutely unobtainable when the bearing-segments are integral with the retaining-blocks.

Having thus described my invention and the method of its application, what I claim is—

1. In a thrust-bearing, the combination of a frame and retaining-blocks secured thereto, with removable bearing-segments, and means for securing the same to said retaining-blocks, substantially as and for the purposes set forth.

2. In a thrust-bearing, a frame, concave retaining-blocks secured thereto and concentric with the shaft, concavo-convex bearing-segments concentric therewith, and means by which said segments may be released or secured in removing or replacing the same, without removing the retaining-blocks, substantially as and for the purposes set forth.

3. In a thrust-bearing, a frame provided with columns having their inner faces parallel on planes tangential to a circle concentric with the shaft, concavo-convex segments concentric with said shaft secured to said retaining-blocks by means of bolts, and means by which said segments may be released or secured in removing or replacing the same, consisting of said bolts and a gland of equal diameter with said segments which is removably secured to the frame of the bearing, substantially as and for the purposes set forth.

4. A thrust-bearing consisting of a frame, retaining-blocks secured thereto and having their inner faces concave and concentric with the shaft, a shaft provided with annular projections or thrust-collars, concavo-convex bearing-segments removably secured to said retaining-blocks and concentric with said shaft, there being annular recesses therein corresponding to said thrust-collars, and a bearing-metal facing secured thereto and held in place by recesses, substantially as and for the purposes set forth.

In testimony that I claim the invention above set forth I affix my signature in presence of two witnesses.

COLEMAN SELLERS.

Witnesses:
W. A. BRACKENRIDGE,
FRANCIS U. WILCOX.